Nov. 20, 1945.   G. R. G. GATES   2,389,498
STEERING MECHANISM FOR MOTOR ROAD VEHICLES
Filed Nov. 25, 1944   2 Sheets-Sheet 1
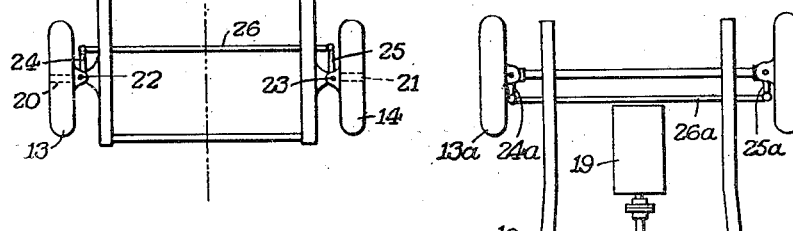
Fig. 1.
Fig. 2.
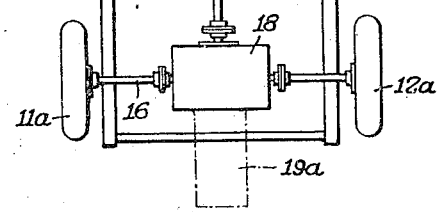
Inventor
Geoffrey Robert Greenbergh Gates
by Stevens and Davis
his attorneys

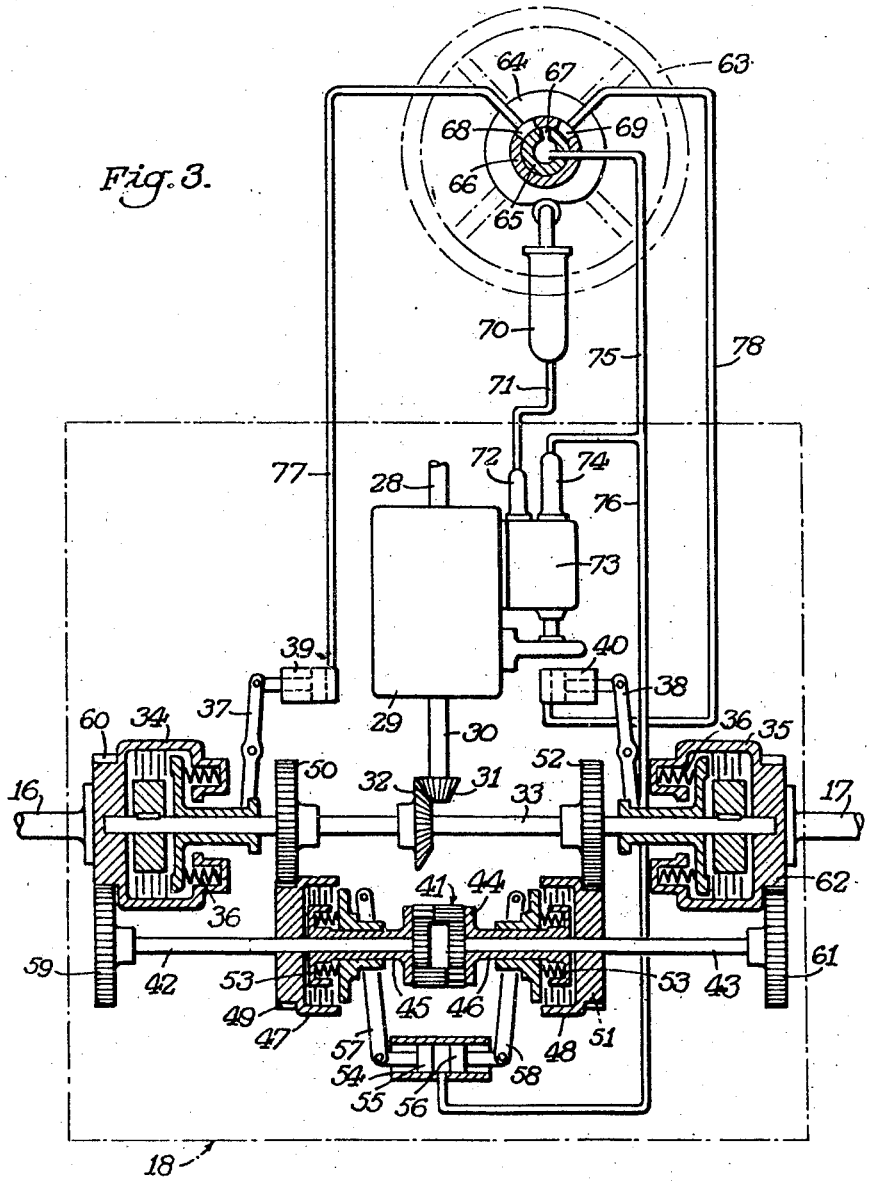

Patented Nov. 20, 1945

2,389,498

UNITED STATES PATENT OFFICE 2,389,498

STEERING MECHANISM FOR MOTOR ROAD VEHICLES

Geoffrey Robert Greenbergh Gates, Leamington Spa, England, assignor of one-half to Automotive Products Company Limited, Leamington Spa, England Application November 25, 1944, Serial No. 565,158
In Great Britain October 1, 1943

4 Claims. (Cl. 180—17)

This invention relates to steering mechanism for motor road vehicles, and it has for its object to provide an improved means for steering mechanically driven wheeled vehicles. It is a further object of the invention to provide an improved form of motor vehicle which can readily be steered to turn within a very small space, and which is as a result exceedingly manoeuvrable, the stability being independent of whether the engine is driving the wheels, or vice versa as when the vehicle is travelling downhill.

According to the invention in a motor road vehicle, the driving mechanism for a pair of coaxial driven wheels is provided with adjusting means whereby the driven wheels may be caused to be positively rotated to produce different individual peripheral speeds when the vehicle is required to follow a curved path, the axes of the wheels remaining at right angles to the longitudinal axis of the vehicle, and to produce equal peripheral speeds when straight travel is desired, the vehicle being supported at a position remote from the driven wheels by one or more wheels mounted to have a castering action. Preferably the driving mechanism comprises a pair of disengageable main clutches interposed respectively between the two driven wheels and the engine or equivalent, a differential gear having two of its elements connected respectively with the driven wheels, and a normally disengaged auxiliary clutch which is connected between the engine and the third member of the differential gear, the adjusting means being arranged to release either one of the main clutches and simultaneously engage the auxiliary clutch. Conveniently also the main clutches are of the frictional type and are arranged to be operated progressively so as to allow slip to occur to an increasing extent as the difference in the peripheral speeds of the driven road wheels increases. If desired two auxiliary clutches may be provided to connect the engine or equivalent with the said third member of the differential gear. The axles of a pair of non-driven road wheels may be mounted pivotally to have a castoring action, said axles being connected together by link mechanism to maintain substantial parallelism of the wheels.

As a further feature of the invention there is provided a motor road vehicle having a driving group of wheels rotating in planes which are fixed with respect to the vehicle and comprising one or more wheels on each side of the vehicle driven from opposite ends of a divided axle, the two halves of which are separately driven from the engine through independently controllable driving clutches and are connected by a differential gear, the differential casing being capable of being connected to the engine by a clutch-controlled gear train, which gear train provides a speed ratio between the engine and the differential casing different from that between the engine and the divided axle, and one or more non-driven supporting wheels mounted for castoring action.

The invention can very conveniently be carried into effect by utilising the driving mechanism described in Patent Specification No. 2,353,554, dated July 11, 1944, which relates to driving means of endless track vehicles. All of the arrangements described in that specification can be applied to the present invention, a coaxial pair of normal road wheels conveniently being used in place of the pair of driving wheels for the endless tracks.

The invention is illustrated in the accompanying diagrammatic drawings, in which:

Figure 1 is a plan of one form of vehicle arranged for front wheel drive;

Figure 2 is a similar view of a vehicle arranged for rear wheel drive; and

Figure 3 shows one arrangement of the combined wheel driving and steering mechanism.

In the arrangement shown in Figure 1 the chassis frame of the vehicle is indicated at 10, and it is fitted with a pair of front wheels 11 and 12 and with a pair of rear wheels 13 and 14, suitable suspension means (not shown) being interposed for the purpose of transferring the weight of the vehicle body and chassis frame 10 to the road wheels. The front wheels 11 and 12 are mounted so that their planes of rotation are at all times parallel with the longitudinal centre line of the vehicle indicated at 15. The wheels 11 and 12 are connected by independent shafts 16 and 17 respectively to a transmission unit 18, which is carried by the chassis frame 10 and is conveniently attached directly to the vehicle engine 19.

The wheels 13 and 14 at the rear of the vehicle are freely rotatable upon stub axles 20 and 21, which latter are mounted upon king pins or equivalent vertical pivots 22 and 23, suitably positioned and directed so as to cause the wheels 13 and 14 to have a castoring action during forward motion of the vehicle. In order to maintain the wheels 13 and 14 in substantially parallel planes the stub axles 20 and 21 are formed with forwardly directed arms 24 and 25 connected together by a link or tie rod 26; the arms 24 and 25 can if desired be arranged to converge towards a point at the front of the vehicle, so that the wheels 13 and 14 depart somewhat from true parallelism as the vehicle follows a curved path, thus compensating for the difference between the radii of the tracks followed by the individual wheels 13 and 14.

Steering of the vehicle is effected by adjusting the driving unit 18 so that the shaft 16 is driven at a different speed from the shaft 17. Thus if the shaft 16 rotates faster than the shaft 17 the wheel 11 will have a greater peripheral speed, and the front part of the vehicle will in consequence be caused to follow a path curving towards the right. The rear part of the vehicle must follow and therefore the wheels 13 and 14 automatically align themselves to the direction of movement owing to the manner in which they are mounted.

If desired the vehicle may be steered by driving the rear wheels at different speeds, and a suitable arrangement is shown in Figure 2. The engine 19 is disposed at the forward end of the vehicle and is connected with the variable driving unit 18 by a longitudinal shaft 27. Alternatively, however, the engine may be bolted direct to the unit 18, as, for instance, is indicated in broken lines at 19a. Shafts 16 and 17 lead from the unit 18 to the rear wheels 11a and 12a respectively, said unit 18 being adapted to drive these wheels at equal speeds when straight travel is required and at different speeds when the vehicle is to turn to the right or the left. The front wheels, which are indicated at 13a and 14a, are mounted to have a castoring action and are maintained in substantial parallelism by arms 24a, 25a and a tie rod or link 26a. Thus, when it is desired to turn the vehicle to the right the wheel 11a is driven at a faster rate than the opposite wheel 12a, and this causes the front of the vehicle to swing sideways, the wheels 13a and 14a automatically turning into alignment with the direction of movement owing to their castoring characteristics.

One convenient form of driving mechanism is shown in Figure 3, this being arranged to operate in a manner which is generally similar to the driving mechanisms described in our above-mentioned patent specification. The drive from the engine, indicated at 28, is taken through a change speed gear box 29 of the usual form, and the output shaft 30 from said gear box is connected by bevel gearing 31, 32 with a transverse drive shaft 33. This drive shaft 33 is connected with the wheel shafts 16 and 17 by means of a pair of main frictional clutches 34 and 35, which are normally held in their engaged positions by springs 36 and are adapted to be progressively disengaged by angular movement of a corresponding release lever 37, 38, when liquid under pressure is fed to one or other of a pair of piston and cylinder motor units 39 and 40 respectively.

The driving mechanism also includes a differential gear 31, which is conveniently of the spur gear type, and the usual free elements of which are constituted by a pair of coaxial shafts 42 and 43 and a differential casing 44. The last-mentioned element is freely rotatable upon the shafts 42 and 43 and has a pair of tubular extensions 45 and 46 leading to a pair of auxiliary clutches 47 and 48, which are adapted to connect the differential casing 44 with the driving shafts 32 and 33 by pairs of meshing gear wheels 49, 50 and 51, 52. The clutches 47 and 48 are normally held in their disengaged positions by springs 53 and they are arranged to be engaged simultaneously by admitting pressure liquid to a motor unit 54. This motor unit has two pistons 55 and 56, which act upon levers 57 and 58 to overcome the springs 53 and force the clutches 47 and 48 into engagement. The differential shaft 42 is connected by gear wheels 59 and 60 with the road wheel shaft 16, while in a similar manner the differential shaft 43 is connected by gearing 61, 62 with the road wheel shaft 17.

The actuation of the various clutches of the driving unit is carried out by moving the usual steering wheel, which is indicated in broken lines at 63. Angularly movable with the steering wheel 63 is a somewhat heart-shaped cam 64 and a tubular valve member 65, which latter fits in a fluid-tight manner within a fixed housing 66. The valve member 65 has a single port, which is closed by the housing 66 when the steering wheel 63 is in its straight ahead position, angular movement of the steering wheel 63, however, being arranged to bring the port 67 into register with either one of a pair of outlet ports 68 or 69 formed in the housing 66. The ports 68 and 69 are connected with the motor cylinders 39 and 40 by pipes 77 and 78. Also movement of the steering wheel 63 in either direction away from its straight ahead position causes the piston of a master cylinder unit 70 to be advanced by the cam 64 and this forces pressure liquid through a pipe 71 into the actuating cylinder 72 of a servo unit 73 of the form described in Patent Specification No. 2,254,998, dated September 2, 1941. Briefly, actuation of the cylinder 72 causes the gear box 29 to operate a master cylinder 74, and this delivers pressure liquid through a pipe 75 leading to the interior of the valve member 65 and through a pipe 76 to the motor unit 54 of the auxiliary clutches.

The driving unit operates in the following manner. For straightforward driving of the vehicle the steering wheel 63 is, of course, in its central position, the hydraulic system being free of pressure so that the main clutches 34 and 35 are fully engaged and the auxiliary clutches 47 and 48 are released. The two wheel shafts 16 and 17 are both therefore driven in the normal manner through the gearing 31, 32; while the casing 44 of the differential gear revolves idly with the two differential shafts 42 and 43. When the steering wheel 63 is turned to the left the cam 64 actuates the master cylinder unit 70, thus bringing the servo unit 73 into action so that pressure liquid delivered by the master cylinder unit 74 flows partly through the pipe 76 to actuate the motor unit 54 and progressively engage the auxiliary clutches 47 and 48, and partly through the pipe 75 to the valve member 65, outlet port 68, and through the pipe 77 to the motor unit 39, which latter acts to disengage the main clutch 34. The wheel shaft 17, of course, continues to be rotated through the main clutch 35, and as the casing 44 of the differential gear is now receiving a positive drive from the shaft 33 through the auxiliary clutches 47 and 48, it follows that the wheel shaft 16 is receiving its drive from the differential shaft 42 through the gearing 59, 60. As this causes the shaft 16 to be rotated at a slower rate than the shaft 17 the vehicle is caused to deviate to the left. In a similar manner movement of the steering wheel 63 to the right causes the main clutch 34 to be engaged and the main clutch 35 to be disengaged, the vehicle then being caused to turn to the right, since the wheel shaft 17 is driven at a reduced speed through the differential gear 41.

Since the momentum of the vehicle varies with the speed of movement, the auxiliary clutches 47 and 48, which act as brakes during steering operations, will have more work to steer the vehicle through a given change of track radius at a high speed than at a low speed, and the steering will thus decrease in sensitivity as the speed increases, this being an important feature which tends to assist stable control at high speeds. If desired the usual brake pedal may be arranged to actuate the master cylinder unit 70, as is described in the above-mentioned specification No. 2,353,554, so as to engage the auxiliary clutches 47 and 48 while both of the main clutches 34 and 35 are engaged, for this causes said auxiliary clutches 47 and 48 to act as efficient brakes, even during normal straight travel of the vehicle.

It will be understood that the arrangements described above are given merely by way of example and that various modifications are possible to suit requirements. Thus, especially in the case of heavy vehicles, two or more wheels may be provided at each side of the vehicle for steering purposes, these wheels usually being coaxial. Further, any form of variable speed gear device may be used for driving the wheels, said device preferably being arranged to produce a predetermined speed relationship between the wheels, for each setting of the steering wheel or equivalent, thus rendering the mechanism independent of prevailing conditions, such as the state of the road and whether the engine is driving the wheels or vice versa. If desired locking means may be provided in connection with those wheels of the vehicle which have a castering action, while if desired auxiliary steering mechanism may be provided so as to control the planes of said wheels and thus enable the vehicle to be readily reversed and otherwise manœuvred.

The invention enables a steering mechanism to be produced which has the advantages of the usual front wheel drive arrangement, and at the same time avoids the necessity of transmitting the power through universal joints, because the planes of the wheels themselves do not change when the steering mechanism is in action, and therefore rigid axles can be used.

What I claim is:

1. In a vehicle including a driving motor, a drive shaft driven thereby and a pair of wheels on opposite sides of the vehicle, a normally engaged primary clutch establishing a driving connection between each wheel and the drive shaft, a three element differential gear, means establishing a driving connection between one of the elements of said differential gear and the driven side of one of said clutches, means establishing a driving connection between another of the elements of said differential gear and the driven side of the other of said clutches, means establishing a driving connection between the third element of said differential gear and said drive shaft, normally disengaged secondary clutch means in said last mentioned means establishing a driving connection, and means for selectively disengaging one of said clutches and for simultaneously engaging said secondary clutch means, whereby one of said driving wheels will be caused to rotate at a greater peripheral speed than the other to cause the vehicle to turn.

2. A vehicle as claimed in claim 1 in which the primary clutches are of the frictional type and are arranged to be operated progressively so as to allow slip to occur to an increasing extent as the difference in the peripheral speed of the wheel increases.

3. A vehicle as claimed in claim 1 in which the secondary clutch means comprises a pair of friction clutches, a side of each of said clutches being connected to the third element of the differential gear, the other side of each of said clutches being connected to said drive shaft.

4. A vehicle as claimed in claim 1 in which the secondary clutch means comprises a pair of friction clutches, a common side of said clutches being connected coaxially on each side of the third element of the differential gear, the other side of said clutches being toothed and said drive shaft being provided with gears in meshing relationship with the toothed side of said clutches.

GEOFFREY ROBERT GREENBERGH GATES.